United States Patent [19]

Hirose

[11] Patent Number: 4,834,936
[45] Date of Patent: May 30, 1989

[54] CONTINUOUS DISSOLUTION APPARATUS FOR SPENT NUCLEAR FUEL

[75] Inventor: Yasuo Hirose, Hitachi, Japan

[73] Assignee: Hitachi, Ltd., Tokyo, Japan

[21] Appl. No.: 91,753

[22] Filed: Sep. 1, 1987

[30] Foreign Application Priority Data

Sep. 1, 1986 [JP] Japan .............................. 61-203707

[51] Int. Cl.[4] ...................... G21C 19/42; G21F 9/00; G21F 9/02; C23G 1/02
[52] U.S. Cl. ................................... 376/310; 134/3; 134/94; 252/626; 252/627; 252/630; 376/261; 376/272; 376/308; 422/903
[58] Field of Search .............. 252/627, 630, 626, 633; 422/159, 903; 423/249, 2, 3, 18, 19, 20, 262; 376/261, 272, 308, 311, 310; 110/237, 238, 342; 134/3, 93, 94, 105, 207, 104

[56] References Cited

U.S. PATENT DOCUMENTS

| | | | |
|---|---|---|---|
| 3,914,388 | 10/1975 | Cathers et al. | 423/249 |
| 4,017,417 | 4/1977 | Clark et al. | 252/630 |
| 4,088,737 | 5/1978 | Thomas et al. | 423/240 |
| 4,229,317 | 10/1980 | Babad et al. | 423/249 |
| 4,277,256 | 7/1981 | Hesky et al. | 55/66 |
| 4,349,453 | 9/1982 | Brugere et al. | 252/627 |
| 4,432,955 | 2/1984 | Henrich et al. | 423/249 |
| 4,636,362 | 1/1987 | Leister | 422/105 |

OTHER PUBLICATIONS

*Management of Gaseous Wastes from Nuclear Facilities*, International Atomic Energy Agency, Vienna, 1980, pp. 139–156.

*Primary Examiner*—Howard J. Locker
*Attorney, Agent, or Firm*—Antonelli, Terry & Wands

[57] ABSTRACT

A continuous dissolution apparatus for spent nuclear fuel in which a container (2) for holding a dissolution processing solution (1) is continuously supplied with nitric acid from a feed port (3), while the processing solution is continuously drawn out from an outlet (4). Baskets (71-74) in the container are packed with spent-fuel chops (6), which are continuously dissolved by the processing solution. The container is provided with a solution reserving section (4) for lowering the concentration of radioiodine contained in the dissolution processing solution, and a partition wall (10) is formed between the solution reserving section and a container body. The dissolution processing solution having overflowed from the upper edge of the partition wall flows into the solution reserving portion (14) through a perforated plate column (11). The solution reserving portion is furnished with a heating coil (12) for heating the dissolution processing solution and generating steam, and a gas blow pipe (13) for injecting an inert or nitrogen oxide gas into the solution. Thus, elementary iodine within the dissolution processing solution of the solution reserving section is expelled from the off-gas outlet (5) of the container together with the steam, and the radioiodine concentration in the dissolution processing solution of the solution reserving section can be lowered.

10 Claims, 1 Drawing Sheet

CONTINUOUS DISSOLUTION APPARATUS FOR SPENT NUCLEAR FUEL

FIELD OF THE INVENTION

The present invention relates to the reprocessing of spent nuclear fuel, and more particularly to a continuous dissolution apparatus for spent nuclear fuel which is well suited to prepare a dissolution processing solution containing a low concentration of radioiodine.

BACKGROUND OF THE INVENTION

The preparation of a dissolution processing solution containing a low concentration of radioiodine has been discussed by the International Atomic Energy Agency in a thesis entitled "Improved Procedures for efficient iodine removal from fuel solutions in reprocessing plants," IAEA-SM-245/16 (1980), pp. 139–156, especially in items 3.2 and 3.3 thereof.

In general, in a case where spent nuclear fuel whose principal component is uranium dioxide is dissolved in nitric acid at 2–7 mol/liter, a substantial amount of nitrogen oxides are produced according to the reaction formula of:

$$2UO_2 + 6HNO_3 \rightarrow 2UO_2(NO_3)_2 + NO + NO_2 + 3H_2O$$

Iodides in a dissolution processing solution are readily oxidized into elementary iodine by nitrous acid which exists in an equilibrium relation with nitrogen oxides in the dissolution processing solution, as follows:

$$2H^+ + 2I^- + 2HNO_2 \rightarrow 2NO + I_2 + 2H_2O$$

On the other hand, the elementary iodine is slowly oxidized in the nitric acid to change into a nonvolatile substance such as iodate:

$$5HNO_3 + I_2 + H_2O \rightarrow 2H^+ + 2IO_3^- + 5HNO_2$$

While the nuclear fuel material is being dissolved in the nitric acid, the nitrous acid exists in the dissolution processing solution, and hence, radioiodine is held in a volatile form. When the uranium dioxide no longer exists in the dissolution processing solution, the nitrous acid in the heated nitric acid is rapidly decomposed to vanish, so that the elementary iodine is likely to be oxidized into the nonvolatile iodate.

The oxidation rate of the elementary iodine in the boiling nitric acid of 2–7 mol/liter is in a direct proportion to the concentration of iodine, and practically, it is about 0.1–1% per minute.

Elementary iodine dissolved in an aqueous solution shifts more easily into its vapor phase as the concentration and temperature thereof are increased. The emission of dissolved elementary iodine may be promoted by blowing a gas into the liquid phase, and the amount of the emission increases depending upon the amount of the gas. When the temperature of the solution is high, the required amount of the gas can be decreased, and ultimately, when water is boiled, the elementary iodine can be expelled by water vapor. Insofar as iodine in the aqueous solution exists in the elementary form, the iodine concentration of the dissolution processing solution can be lowered from $10^{-3}$–$10^{-4}$ mol $I_2$/liter (26–260 ppm) to $10^{-6}$ mol $I_2$/liter (0.26 ppm) by the vaporization of 10% of the whole volume of solution.

In a conventional dissolution process, elementary iodine is expelled from a dissolution apparatus by a mixture which consists of $NO_x$ and water vapor. Usually, the rate of boiling is raised after the end of the dissolution so as to expel the iodine before the iodine becomes a non-volatile form.

The above prior art is applied to a spent-fuel dissolution apparatus of the so-called batch-process type, and an example of the procedure is carried out as follows:
(1) The dissolution apparatus is loaded with nitric acid.
(2) A basket packed up with nuclear-fuel chops is put in.
(3) By raising the temperature of the nitric acid, the dissolution of a spent fuel material is started and is then accelerated.
(4) While nitric acid is being added into a dissolver, it is boiled to exhaust vapor.
(5) After the end of the dissolution, residual iodine is expelled by the boiling and the vapor exhaust.
(6) After being cooled, the dissolution processing solution is drawn out of the apparatus.

Meanwhile, in the continuous dissolution system to which the present invention is directed, an example of the procedure is as follows:
(1) A container for a dissolution processing solution is filled with dissolution processing at all times.
(2) Nuclear-fuel chops are put in the container at fixed time intervals.
(3) Nitric acid is continuously supplied, and the dissolution processing solution is continuously drawn out.
(4) The temperature of the solution is held at a fixed point at all times.

In the continuous dissolution system, the dissolution processing solution is continuously fed with radioiodine which is continuously produced by dissolution of the nuclear-fuel chops. Further, the dissolution reaction of a nuclear fuel material proceeds in at least a portion of the dissolution processing solution-container at all times. $NO_x$ is accordingly generated, and nitrous acid exists in equilibrium with the $NO_x$. Therefore, the oxidation of the iodine into iodate may be prevented to a considerable degree. In case of the continuous dissolution system, the radioiodine is normally supplied continuously into the dissolution processing solution by the dissolution of the nuclear-fuel chops, while at the same time, the dissolution processing solution mingled with the nuclear-fuel chops at random is taken out continuously. Thus, whereas in the batch-process dissolution apparatus, 99% of the radioiodine emitted from the spent nuclear fuel is removed from the dissolution processing solution after the final process for expelling the iodine, the removal percentage becomes approximately 95% in the continuous dissolution apparatus.

SUMMARY OF THE INVENTION

An object of the present invention is to provide a continuous dissolution apparatus which can decrease the concentration of radioiodine contained in a dissolution processing solution.

The object of the present invention is accomplished by providing a continuous dissolution apparatus comprising a solution reserving section which is formed in a part of a container for holding a dissolution processing solution in the continuous dissolution apparatus, and means to decrease the concentration of radioiodine in the dissolution processing solution within the container, whereupon the dissolution processing solution is drawn out of the apparatus.

The solution reserving section is formed at the part of the container of the continuous dissolution apparatus which does not easily induce the back flow or circulation of the solution between the reserving section and the greater part of the container. Further, the solution should desirably flow in only one direction toward a solution outlet via the solution reserving section.

The means to decrease the concentration of the radioiodine may include the heating of the solution, the blowing of an inert gas or a nitrogen oxide gas into the solution, a mechanism for improving the contact between gas and liquid, and any combination thereof.

BRIEF DESCRIPTION OF THE DRAWING

The single FIGURE is a front vertical sectional view of an embodiment of the present invention.

DETAILED DESCRIPTION OF THE PREFERRED EMBODIMENT

Figure 1:
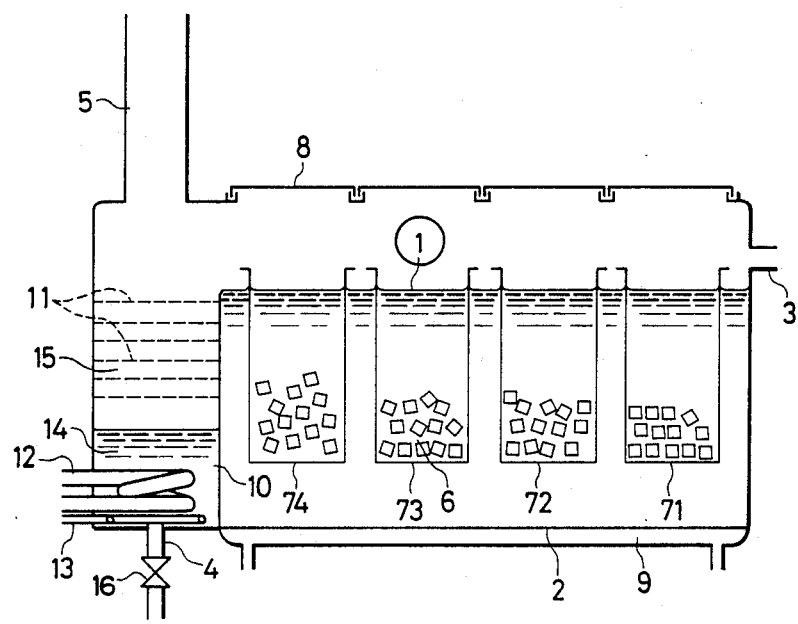

Referring to FIG. 1, a continuous dissolution apparatus in one embodiment of the present invention is basically constructed of a container 2 for holding a dissolution processing solution 1, a nitric acid feed port 3, a dissolution processing solution-drawing outlet 4, a dissolution off-gas outlet 5, baskets 71–74 for packing spent-fuel chops 6, covers 8 of openings for inserting the baskets 71–74 into the container 2, and a temperature regulating jacket 9. A partition wall 10 which is made of a weir or one or several division plates instead of the weir, is included in the container 2 and forms a dissolution processing solution-reserving section.

The dissolution processing solution-reserving section includes the solution drawing-out port 4, and is furnished with one or more perforated plate columns 11 which are disposed substantially horizontally and annularly in order that the dissolution processing solution having overflowed from the upper edge of the weir at one end thereof may be introduced into a solution-reserving section 14 while contacting a gas in a section 15 which is defined between the partition wall 10 and the container 2. Further shown are a heating coil 12, and a gas blow pipe 13 for blowing nitrogen oxides or a gas mixture containing nitrogen oxides into the columns. The dissolution processing solution in which the concentration of radioiodine is lowered by the above means stays in the bottom part of the solution reserving section 14, and the liquid level thereof is controlled by a valve 16.

The dissolution processing solution 1 is produced by the reaction between nitric acid supplied through the nitric acid feed port 3 and a fuel material contained in the spent-fuel chops 6, and it is held at a constant temperature by the temperature regulating jacket 9.

The baskets 71–74 for packing the spent fuel chops 6 are provided with openings so that the dissolution processing solution containing the nitric acid may pass therethrough. Since the nitric acid is consumed with the dissolution of the fuel material, nitric acid is supplied through the nitric acid feed port 3 so that the concentrations of the fuel material and nitric acid in the dissolution processing solution may be held at desired condition. The dissolution processing solution whose amount corresponds to the amount of the supplied nitric acid, overflows from the upper edge of the partition wall 10 and enters the solution reserving section 14 via the perforated plate columns 11.

The solution reserving section 14 is heated by the heating coil 12 until it boils. As described above, nitrogen oxides or a gas mixture containing them are blown in by the gas blow pipe 13. The gas and steam come into contact with the liquid drops of the dissolution processing solution flowing down inside the perforated plate columns 11, pass through the top parts of the perforated plate columns 11 and are exhausted from the dissolution off-gas outlet 5.

The nitrogen oxides are dissolved in the dissolution processing solution and produce nitrous acid in accordance with the following reaction formula:

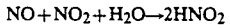

$$NO + NO_2 + H_2O \rightarrow 2HNO_2$$

The nitrous acid changes iodine ions and iodate ions in the dissolution processing solution into elementary iodine:

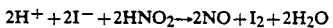

$$2H^+ + 2I^- + 2HNO_2 \rightarrow 2NO + I_2 + 2H_2O$$

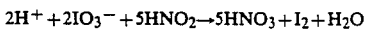

$$2H^+ + 2IO_3^- + 5HNO_2 \rightarrow 5HNO_3 + I_2 + H_2O$$

The elementary iodine in the dissolution processing solution is heated by the steam and flows down through the perforated plate columns 11, and it is carried away by the steam and the nitrogen oxides or the mixture thereof. Therefore, the dissolution processing solution in the solution reserving section 14 is discharged out via the solution drawing-out port 4 after the iodine concentration thereof has been sufficiently decreased.

According to the present embodiment, the following effects are brought forth:

(1) Since the dissolution processing solution is subjected to the iodine removal process immediately after the production thereof, the proportion at which iodine in the solution changes into a nonvolatile chemical species such as iodate is low, and the removal of the iodine is easy.

(2) The iodine removal from the dissolution processing solution is performed quite continuously, and a large processing capacity is attained with an installation of small volume.

(3) Since the dissolution processing solution in the container of the continuous dissolution apparatus and in the solution reserving section do not mix, the iodine removal process is effectively carried out.

(4) A off-gas generated due to the iodine removal can be joined with the dissolution off-gas and processed by an identical system.

According to the present invention, the removal of radioiodine from a dissolution processing solution, which has not hitherto been achieved within a dissolution apparatus in the continuous dissolution system, can be realized, and a removal percentage equal to that of a batch-process dissolution apparatus can be attained.

Thus, the invention dispenses with an iodine expelling installation which has hitherto been required separately from the continuous dissolution apparatus. Moreover, it has great economical effects in the expenses of the amount of heat, the amounts of gases, etc. and the expense of treatment of the off-gases.

The above effects can be accomplished, not only by the foregoing embodiment, but also by modifications to be stated below:

(1) The dissolution apparatus of the embodiment has a trough which is disposed substantially horizontally, and it is so constructed that nitric acid is supplied from one end of the trough, while a dissolution processing solution flows out via a solution reserving portion at the other end. More generally, however, the effects of the present invention are not concerned with the inflow position of the nitric acid, but they can be achieved even when the solution reserving portion 14 is formed at any desired position in the dissolution apparatus, for example, between the baskets 73 and 74, and a channel (not shown) for bypassing the dissolution processing solution from the basket 73 to the basket 74 is provided.

(2) The effects of the present invention can be achieved also in a case where the trough forms at least a part of a ring.

(3) The effects of the present invention can also be achieved in such a way that, unlike the construction described in the embodiment, the solution reserving portion has a structure for promoting the gas-liquid contact such as a compacted column or a bubble cap column, other than the perforated plate column.

(4) The effects of the present invention can be achieved in such a way that, unlike the construction described in the embodiment, a gas injection to the solution reserving portion has a heat source which heats the dissolution processing solution until it boils.

(5) When a structure adapted to inject a gas into the solution reserving portion or to generate a vapor therein is used, the effects of the present invention are achieved without the structure for promoting the gas-liquid contact such as the perforated plate column, the compacted column or the bubble cap column.

(6) In the above case of Item 5, the effects of the present invention can be achieved even when the solution reserving section is formed by a channel constructed of division plates, rather than a partition wall.

(7) The port for drawing out the dissolution processing solution may well be an overflow port which keeps a constant liquid level.

What we claim is:

1. A continuous dissolution apparatus for processing spent nuclear fuel, in which the spent nuclear fuel is successively introduced and then continuously dissolved and processed with a dissolution processing solution, the apparatus comprising:
   introduction means for introducing spent nuclear fuel into said apparatus;
   a dissolution section for holding a solution which dissolves said spent nuclear fuel and for holding said spent nuclear fuel during dissolution thereof, and a solution reserving section connected to the dissolution section for holding the dissolution processing solution which flows from the dissolution section and which retains said dissolution processing solution so that a concentration of radioiodine contained in said dissolution processing solution may be decreased;
   means for decreasing the radioiodine concentration in said dissolution processing solution within said solution reserving section; and
   a drain means for draining said dissolution processing solution from said solution reserving section, said drain means being located at a bottom part of said solution reserving section.

2. A continuous dissolution apparatus for processing spent nuclear fuel as defined in claim 1, wherein a weir is provided between said solution reserving section and said dissolution section.

3. A continuous dissolution apparatus for processing spent nuclear fuel as defined in claim 2, wherein said means for decreasing the radioiodine concentration comprises at least one member selected from a contact means for promoting a gas-liquid contact, heating means for heating the dissolution processing solution to generate vapor, and gas blowing means for blowing gases into said dissolution processing solution.

4. A continuous dissolution apparatus as defined in claim 1, wherein a channel is provided between said solution reserving section and said dissolution section, for preventing a back flow of said dissolution processing solution from said solution reserving section.

5. A continuous dissolution apparatus for processing spent nuclear fuel as defined in claim 3, wherein said means for decreasing the radioiodine concentration comprises contact means for promoting a gas-liquid contact which includes a trough which is substantially horizontally disposed in said solution reserving section, and the dissolution processing solution which overflows from an upper edge of said weir is introduced to one end of said trough and flows into a lower portion of said solution reserving section from another end of said trough.

6. A continuous dissolution apparatus for processing spent nuclear fuel as defined in claim 3, wherein said means for decreasing the radioiodine concentration comprises gas blowing means for blowing gases into said dissolution processing solution, said gases being selected from the group consisting of an inert gas and a nitrogen oxide gas.

7. A continuous dissolution apparatus as defined in claim 3, wherein said means for decreasing the radioiodine concentration comprises contact means for promoting a gas-liquid contact which includes one or more perforated plate columns disposed substantially horizontally and annularly in said solution reserving section, and the dissolution processing solution which overflows from an upper edge of said weir flows through said perforated plate columns into a lower portion of said solution reserving section.

8. A continuous dissolution apparatus as defined in claim 1, wherein said introduction means comprise baskets in which spent nuclear-fuel is packed, and which may be introduced into said dissolution section.

9. A continuous dissolution apparatus as defined in claim 1, further comprising port means for supplying solution to said dissolution section.

10. A continuous dissolution apparatus as defined in claim 1, further comprising a temperature regulating jacket surrounding at least said dissolution section, which holds said dissolution processing solution at a constant temperature.

* * * * *